United States Patent [19]
Einbinder

[11] 3,945,482
[45] Mar. 23, 1976

[54] ORTHOGONAL INPUT KEYBOARDS

[76] Inventor: Harvey Einbinder, 308 W. 97 St., New York, N.Y. 10025

[22] Filed: Dec. 14, 1973

[21] Appl. No.: 424,799

[52] U.S. Cl. ................................ 197/100; 197/1 A
[51] Int. Cl.² ............................................ B41J 5/10
[58] Field of Search ............ 197/9, 98, 99, 100, 1 A

[56] References Cited
UNITED STATES PATENTS

| | | | |
|---|---|---|---|
| 1,395,049 | 10/1921 | McNamara | 197/100 |
| 1,468,566 | 9/1923 | Hall | 197/98 |
| 2,080,457 | 5/1937 | Bower | 197/100 |
| 2,102,526 | 12/1937 | Guilfoyle | 197/100 |
| 2,369,807 | 2/1945 | Solon | 197/98 |
| 3,698,532 | 10/1972 | Dodds | 197/100 |

FOREIGN PATENTS OR APPLICATIONS

| | | | |
|---|---|---|---|
| 808,874 | 2/1937 | France | 197/100 |
| 1,255,117 | 11/1967 | Germany | 197/100 |
| 2,017,063 | 10/1970 | Germany | 197/100 |
| 174,678 | 4/1935 | Switzerland | 197/100 |

OTHER PUBLICATIONS
"The Tyranny of Qwerty", Charles Lekberg, Sat. Rev., Sept. 30, 1972, pp. 37–40.

*Primary Examiner*—Edgar S. Burr
*Assistant Examiner*—R. T. Rader

[57] ABSTRACT

Orthogonal ten-finger keyboards are disclosed for typewriters, computer terminals, and other devices processing alphanumeric information that maximize entry rates and stroking accuracy—and minimize finger motions and the time needed to master the keyboard. The invention employs a plurarity of vertically oriented keys adjacent to horizontal home keys. The invention places five high frequency consonants on home keys under the fingers of the right hand; the space and four high frequency vowels on home keys under the fingers of the left hand; and ten medium frequency characters on adjacent vertical keys. Two-key chords executed by fingers of the same hand generate common two-character sequences belonging to the keys stroked. The keyboard is split into rotated halves containing curved key rows and slanted key tops of variable height to follow the architecture of the hand. The invention discloses optimum orthogonal keyboards for English, German, French, Italian, Spanish, Portuguese, Swedish, and Dutch.

13 Claims, 11 Drawing Figures

ENGLISH

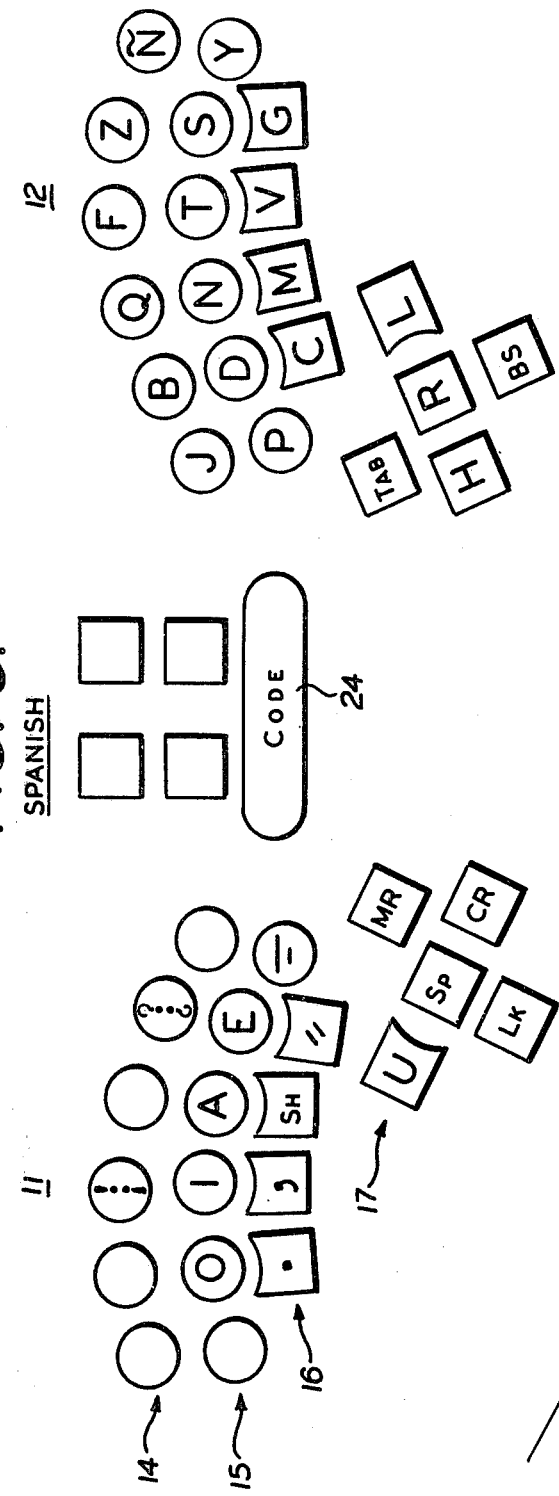

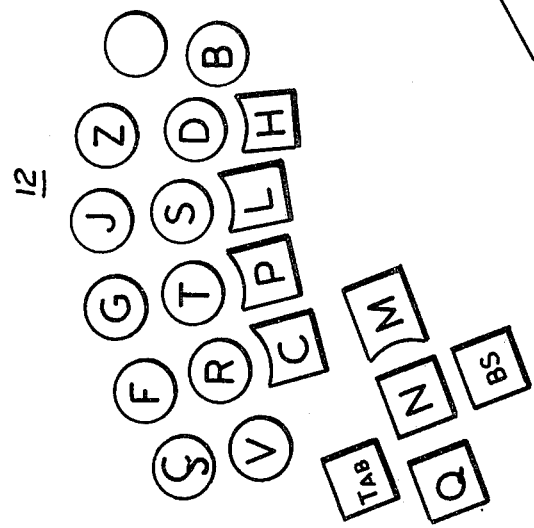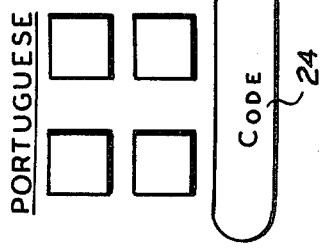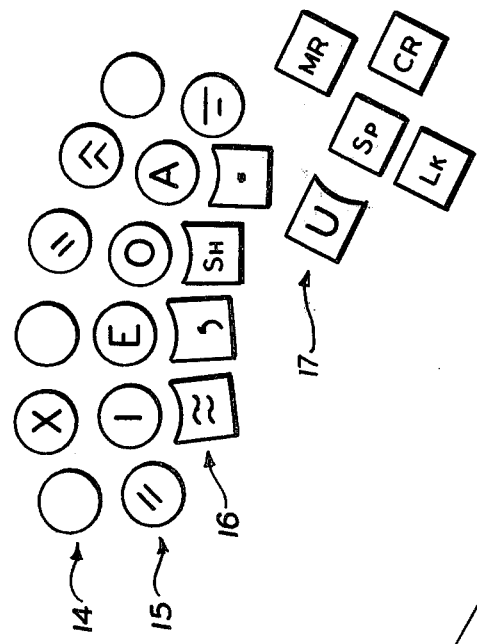
FIG. 6.
PORTUGUESE
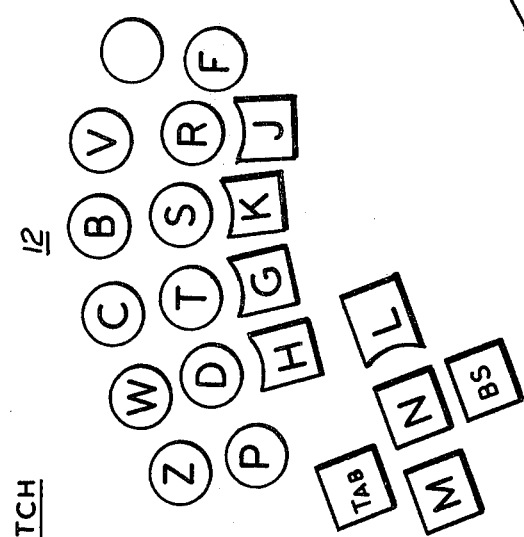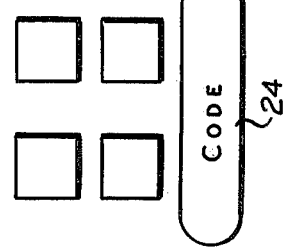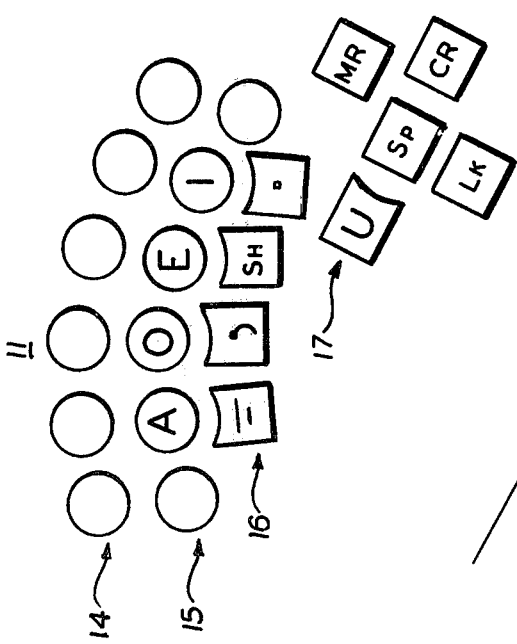
FIG. 7.
DUTCH

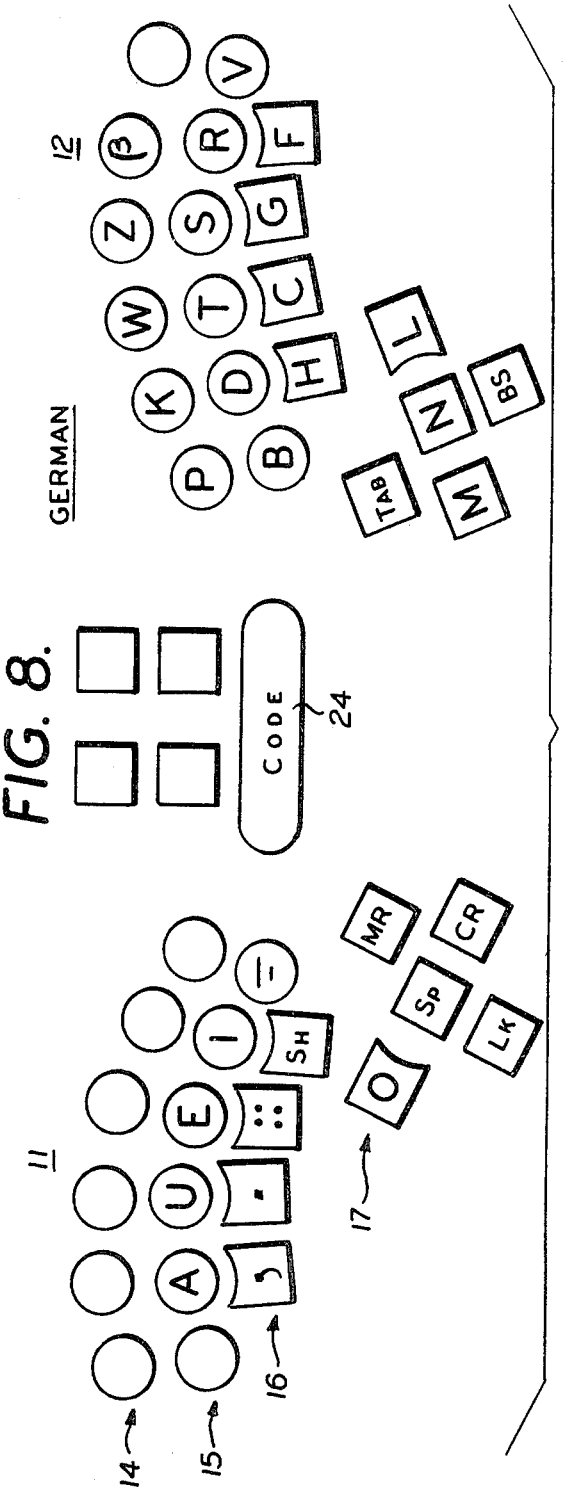
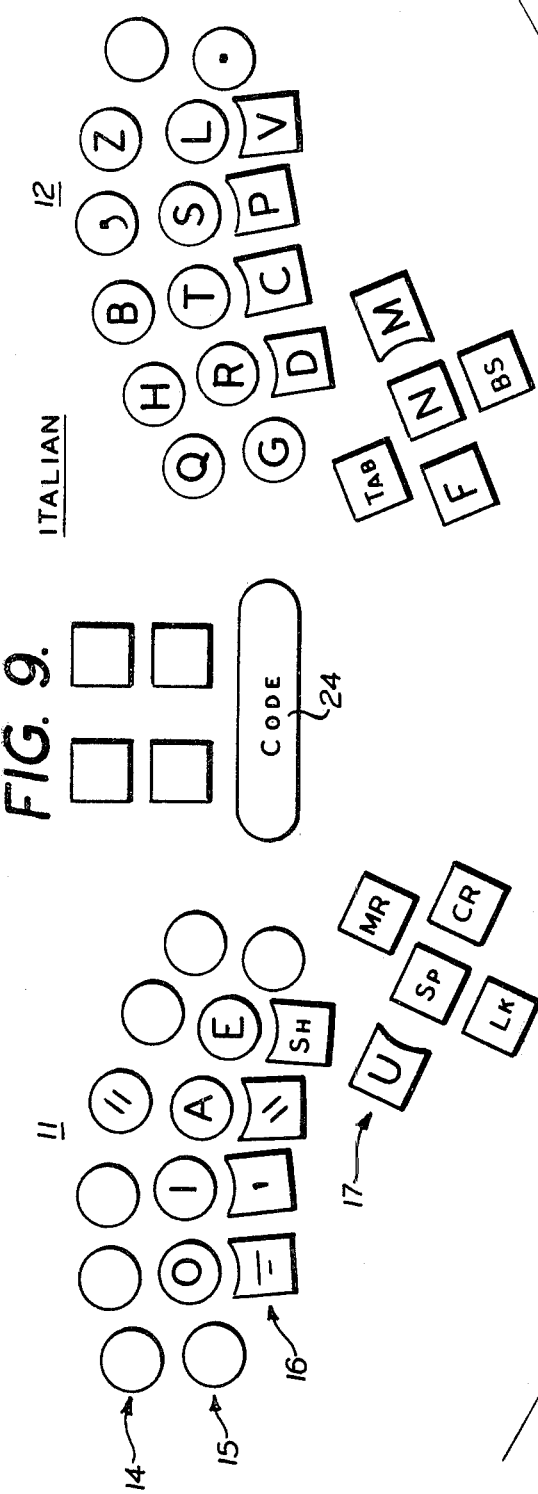

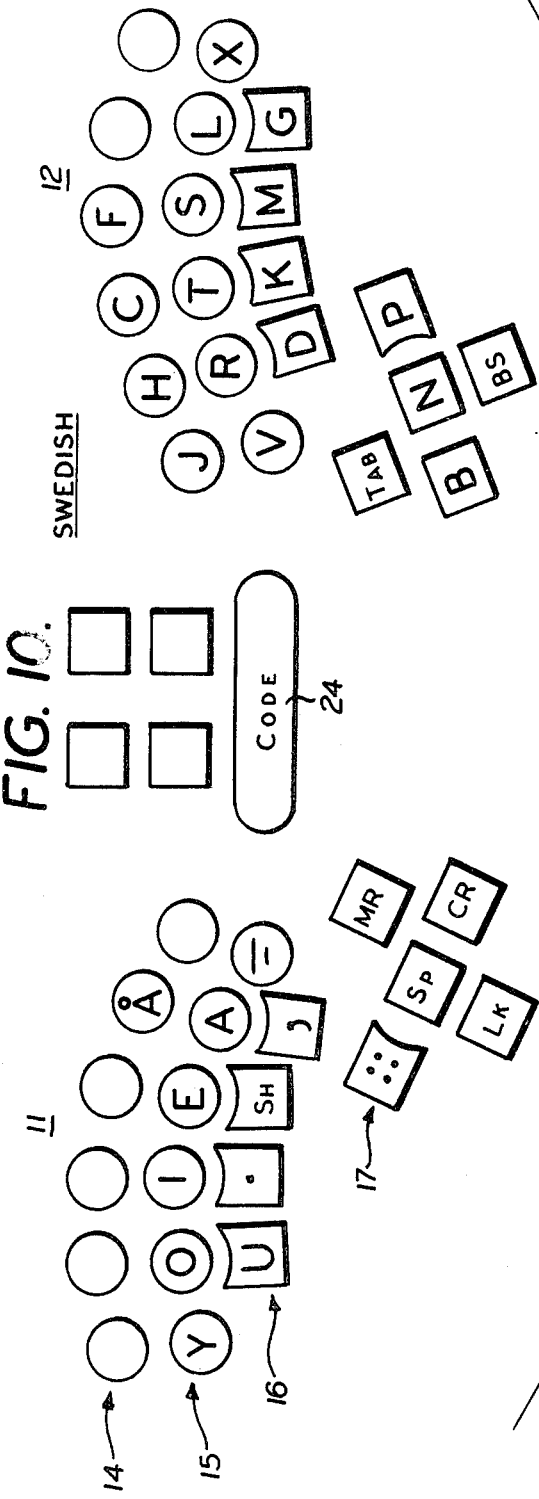
FIG. 10. SWEDISH
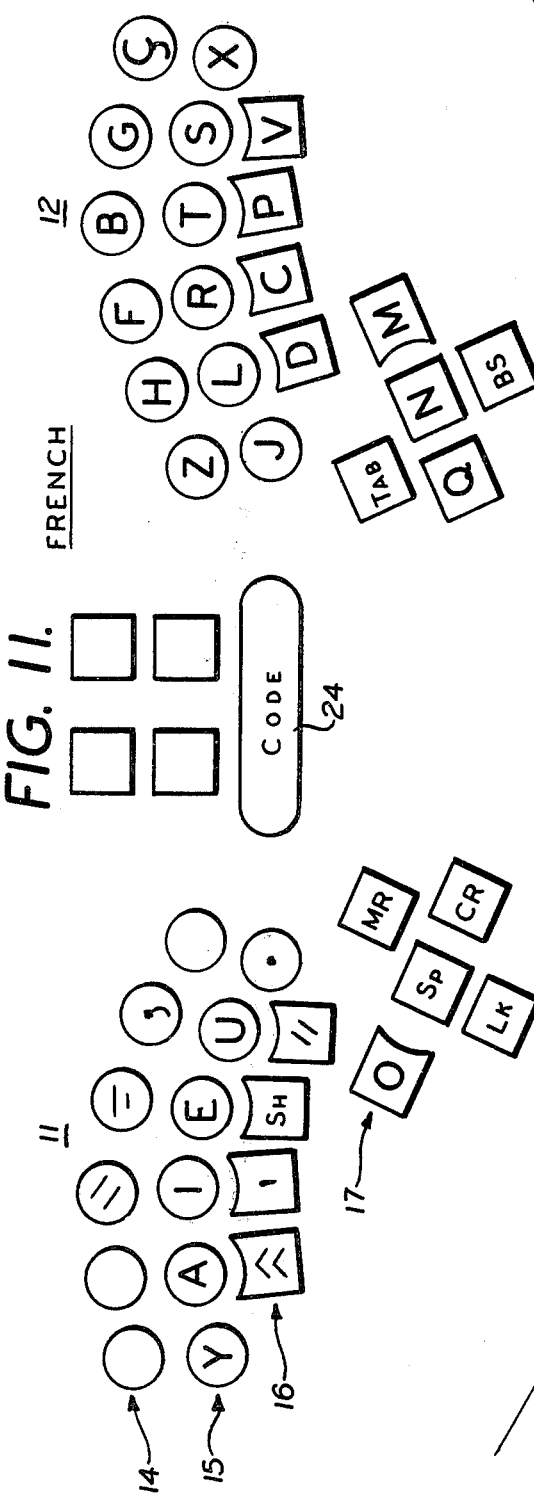
FIG. 11. FRENCH

ORTHOGONAL INPUT KEYBOARDS

FIELD OF THE INVENTION

This invention relates to input keyboards for typewriters, computer terminals, and other devices processing linguistic information, and methods of designing optimum keyboards in any alphabetic language. An input keyboard may be defined as an array of keys operated by the fingers of both hands to transfer graphic characters and control instructions to a machine. The keyboard thus serves as an interface between a human operator and a machine handling alphanumeric symbols. The output may include, but is not limited to, visible characters on paper (typewriters), characters on a fluorescent screen (cathode ray tubes), holes in paper tapes or cards (tape perforators, card punches), or changes in the magnetization of tapes or disks (computer input stations).

DESCRIPTION OF THE PRIOR ART

The universal (qwerty) typewriter keyboard used in Europe and America is a legacy of the manual typewriter invented a century ago. Its arrangement of letters and controls was fixed long ago before the advent of touch typing. The universal keyboard suffers from a number of defects. Its distribution of letters disregards variations in letter frequencies and the strength of individual fingers. The same arrangement is adopted for many languages, although the frequency of specific letters varies from language to language.

On the standard keyboard, the left hand executes more strokes and completes more complex finger motions than the agile right hand. Many intricate stroking sequences must be performed by the fingers of the same hand because common vowels and consonants are alloted to the same hand. The middle letter row is not a true home row because more strokes occur on the top letter row than on the middle row. The straight key rows consist of keys stggered on different rows that do not fit the hand. Horizontal key tops ignore differences in finger length—and the weak little fingers must operate shift and control keys at the edges of the keyboard.

Previous inventors have tried to correct these deficiencies. They have proposed splitting the keyboard into two separate halves, with curved key rows to fit the hand. They have suggested keys of variable height to compensate for differences in finger length, and have advocated moving shift and control keys to the center of the keyboard to be operated by the thumb or fourth finger. These innovations have not succeeded on the universal keyboard because its arrangement of letters leads to complex stroking patterns that mask any improvements due to geometric changes.

Inventors have sought to simplify stroking motions by setting common letters on home keys directly under the fingers, so a majority of strokes lie on the middle row, rather than the top letter row. They have distributed other letters so the number of strokes alloted to individual fingers varies according to their strength—the most strokes being made by the fourth finger, the least by the little finger. The most systematic effort in this direction was undertaken forty years ago by Dvorak and Dealey in U.S. Pat. No. 2,040,248. These inventors applied linguistic statistics to maximize successive strokes by alternate hands and to minimize successive strokes by the same finger.

Dvorak and Dealey developed a simplified keyboard for the English language based on the frequency of various two-letter combinations. They placed common vowels on the home row of the left hand, and common consonants on the home row of the right hand. They assigned other vowels, punctuation marks, and rare consonants to the left hand—and remaining consonants to the right hand. However, they retained the spacial configuration of the standard keyboard with its staggered keys in adjacent rows, and controls at the corners of the keyboard. (An attempt has been made to overcome these geometric limitations in U.S. Pat. 3,668,532.)

Accordingly it is an object of this invention to provide orthogonal input keyboards that contain vertically oriented keys adjacent to the home keys that may be operated by bending fingers resting on home keys toward the palm.

Another object of this invention is to provide optimum orthogonal keyboards for English, German, French, Italian, and Spanish.

Another object of this invention is to minimize finger motions by assigning high frequency letters to home keys, medium frequency characters to adjacent vertically oriented keys, and low frequency characters to remaining keys.

Keyboard Arrangement:

Input keyboards are disclosed containing orthogonally oriented surfaces that are suitable for electronic typewriters, CRT terminals, computer input stations, and other devices processing linguistic information. The invention outlines a systematic method of designing optimum keyboards in any alphabetic language that maximizes entry rates and stroking accuracy, and minimizes finger motions and the time required to learn the keyboard. The invention employs vertically oriented keys adjacent to the home keys that may be actuated by bending fingers resting on home keys toward the palm. The concave stroking surfaces of these vertical keys mirror the shape of bent fingers striking these keys.

The keyboard allots characters and controls to all ten fingers—utilizing the full stroking capacity of both thumbs by setting common characters under all ten fingers. The space key is placed on the left home thumb key, flanked by the carriage return key and a vowel key. A high frequency consonant is set on the right home thumb key flanked by two other consonants. The greater manual agility of the right hand is utilized by assigning consonants to the right hand—and the space, vowel, and diacritical keys to the left hand. This division of characters insures that two out of three successive letters and spaces lie on opposite sides of the keyboard.

The speed of chord stroking is combined with the ease of serial input by employing two-key chords to generate common two-character combinations lying on the same side of the keyboard. Chords are produced by simultaneously striking key-pairs containing the characters appearing in frequent two-character sequences.

Keys are spacially arranged to fit the hand. The keyboard is divided into two separate halves. Each half is rotated about 15°, so the hand, wrist, and forearm lie in a straight line from the shoulders when fingers rest on the home keys. Key rows are curved to follow the shape of the hand. The thumb row is inclined to follow the thumb from flexure to extension. Key tops have variable height to compensate for differences in finger length. Key tops on the upper letter row are tilted for easy stroking from the home position. Stroking surfaces on the number row are vertically oriented, so they can be operated by a horizontal motion of extended finger tips.

The space and four high frequency vowels are on home keys directly under the fingers of the left hand. Five high frequency consonants are on home keys directly under the fingers of the left hand. These ten home-key characters correspond to the commonest characters in most European languages, and account for three out of four of the letters and spaces in typical texts.

Table 2 and Table 3 of the copending patent application Ser. No. 394,516 list the frequency of the space and the five commonest vowels, and the frequency of the six commonest vowels, respectively, for English, German, French, Italian, and Spanish.

The four home-key vowels under the fingers of the left hand are: a, e, i, and o for English, Italian, Spanish, Portuguese, Swedish, and Dutch. The u replaces the o as a home vowel in German and French. The five high frequency consonants on home keys under the fingers of the right hand are: n, r, s, t, and d in German, Spanish, Dutch, and Portuguese. The h replaces the d as a home consonant in English; the l replaces the d in Italian, Swedish, and French.

Letters are distributed so common two-character sequences on the same side of the keyboard may be readily generated by operating the corresponding character keys simultaneously or sequentially. Letters are arranged on home keys so that important one-hand digraphs are stroked by adjacent fingers, or by the thumb and another finger. Medium frequency characters are set on adjacent vertical keys to facilitate input of significant one-hand digraphs involving vertical keys.

The number row is split into even and odd portions. Odd are assigned to the left hand—even digits to the right hand. Code and function keys are set between the split halves of the keyboard, so they can be actuated by the fourth finger. Diacritical keys generate diacritical signs in foreign languages, but do not advance the system in the horizontal direction. A single shift key is used to produce upper-case characters—acting on only a single character and automatically returning the system to lower-case operation. Striking the space and hyphen keys within a given number of spaces from the end of a line automatically advances the system to the next line.

The lower-case period generates the multiple characters needed to go from one sentence to another. Chord strokes generate the characters required to pass from one paragraph to another. Operating the lower-case comma, colon, or semi-colon keys automatically produces a space after each of these punctuation marks. Actuating the upper-case period and comma keys produces the period and comma needed in decimals, numbers, and abbreviations.

BRIEF DESCRIPTION OF THE DRAWINGS

FIG. 3 is a cross-section through a thumb row taken along the line 3—3 of FIG. 1 illustrating the vertically oriented thumb key and the inclined thumb key outside the home position.

FIG. 4 is a cross-section through a vertical set of keys at the interior of the keyboard taken along the line 4—4 of FIG. 1 illustrating the inclined key tops outside the home position, and the vertically oriented keys on the number row and the lower letter row.

FIG. 5 is a top view of part of the orthogonal keyboard for the Spanish language illustrating the location of the most important letters and symbols.

FIG. 6 is a top view of part of the orthogonal keyboard for the Portuguese language illustrating the location of the most important letters and symbols.

FIG. 7 is a top view of part of the orthogonal keyboard for the Dutch language illustrating the location of the most important letters and symbols.

FIG. 8 is a top view of part of the orthogonal keyboard for the German language illustrating the location of the most important letters and symbols.

FIG. 9 is a top view of part of the orthogonal keyboard for the Italian language illustrating the location of the most important letters and symbols.

FIG. 10 is a top view of part of the orthogonal keyboard for the Swedish language illustrating the location of the most important letters and symbols.

FIG. 11 is a top view of part of the orthogonal keyboard for the French language illustrating the location of the most important letters and symbols.

DESCRIPTION OF THE PREFERRED EMBODIMENTS

Figure 1:
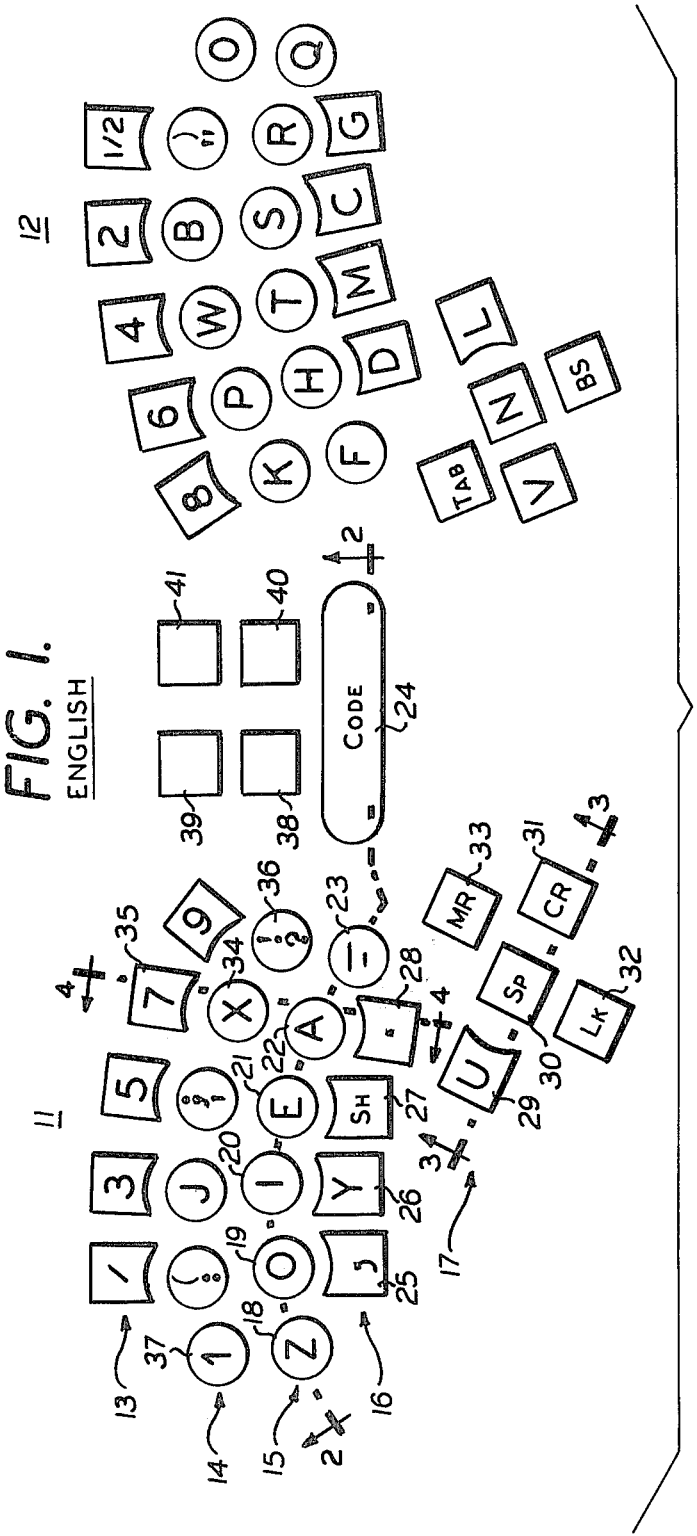
FIG. 1 is a top view of the orthogonal keyboard for the English language illustrating the location of letter and control keys, and the spacial division of the keyboard into two rotated halves containing curved key rows that follow the shape of the hand.

The optimum keyboards presented in this invention correct the shortcomings described above.

The keyboards of this invention employ orthogonal key surfaces and utilize the full stroking capacity of all ten fingers to actuate letter and control keys. The geometry of the hand fixes the spacial orientation of stroking surfaces—permitting keys to be operated by simple digital movements. Vertically oriented keys located next to horizontal home keys are actuated by bending fingers resting on home keys toward the palm.

Although optimum keyboards are disclosed for English and seven European languages, the orthogonal configuration may be fruitfully utilized for a much wider class of languages—especially when an extensive repertory of single key and chord strokes is needed to generate a large number of characters. Examples include the ideographic languages of Asia (Chinese, JHapanese, Thai), and the languages of India whose script is derived from the Devangari alphabet (Hindi, Tamil, Telegu). Another example is Arabic where the form of a letter depends on whether it stands alone, or appears at the beginning, interior, or end of a word.

THE ORTHOGONAL KEYBOARD

A copending patent application Ser. No. 394,516; filed Sept. 4, 1973) expounds the kinesthetic and linguistic principles underlying successful design for any alphabetic language. These principles lead to a key configuration that agrees with the architecture of the hand, and a letter arrangement based on a statistical analysis of character sequences occurring in the language. A major innovation is the use of all ten fingers to input letters and controls. Using the full motor capacity of both thumbs substantially simplifies finger motions and leads to higher entry rates and greater stroking accuracy.

The invention disclosed herein significantly extends the power and utility of the ten-finger keyboard by employing a set of vertically oriented keys adjacent to the home keys. One of these vertical keys is next to the home thumb key—the others are on the lower letter row. These vertical keys may be actuated by bending fingers resting on home keys toward the palm of the hand. The configuration may be described as a conformal orthogonal keyboard because key locations conform to the geometry of the human hand, and its vertically and horizontally oriented stroking surfaces are essentially perpendicular to each other.

Vertically oriented keys have been introduced previously on the number row of the ten-finger keyboard to permit numbers to be stroked by a horizontal motion of extended finger tips from the home position. In the present invention, vertically oriented keys adjacent to the home keys furnish ten easy stroking positions, one for each finger. These keys may be regarded as subsidiary home keys, since they may be operated almost as readily as the horizontal home keys. As a result, these two sets of characters may be interchanged with only a limited loss of input efficiency.

Adjacent vertical keys have concave stroking surfaces to mirror the cylindrical shape of fingers in the home position. These concave surfaces almost touch the fingers—shortening finger movements and permitting faster input and fewer errors. The concave surfaces distribute stroking impact over a larger area of the fingers and thumbs, cushioning impact when vertical keys are struck by fleshy parts of the thumb and fingers.

These vertical keys are easier to operate than horizontal keys in the same location. Striking horizontal keys in adjacent rows on conventional keyboards requires two distinct muscular movements. Fingers must be bent or extended from the home position until they are directly over the corresponding key; then they must be pressed down. In contrast, vertical keys adjacent to the home keys may be struck by simply bending fingers toward the palm. Since no judgment of distance is required, these keys can be operated more swiftly and accurately than horizontal keys in the same position.

Vertical stroking surfaces permit rapid serial or simultaneous entry of one-hand digraphs by adjacent fingers, even for keys in different rows because vertical keys may be actuated by simply bending the fingers. Vertical thumb keys are particularly useful because of the motor independence of the thumb and other fingers. Consequently a much larger of repertory of two-character sequences can be processed effectively on orthogonal configurations than on horizontal arrays because of the greater number of key combinations that can be readily stroked.

On the keyboards of this invention, stroking motions conform to the geometry of the hand. Bending fingers toward the palm to operate vertically oriented keys is a muscular movement that suits the structure of the hand. Because of its simplicity, fewer neural instructions must be transmitted from the brain to the fingers, which lightens the cerebral labor associated with keyboarding. Since one out of six characters lie on adjacent vertical keys, the introduction of vertical stroking surfaces significantly reduces the skills needed to process representative texts.

The orthogonal keyboard distributes motor alternatives more efficiently than horizontal arrangements. Five keys instead of six are alloted to the fourth finger of each hand—and only two common characters are assigned to the little finger of each hand. The presence of eight vertically oriented keys on the lower letter row results in thirty-eight primary stroking positions outside the number row—leading to greater input efficiency and more freedom in designing the keyboard.

Touch typing is acquired automatically because nine out of ten characters in typical texts occur on horizontal home keys or on adjacent vertical keys hidden from view. Kinesthetic obstacles associated with stroking two-key sequences in different rows are sharply reduced, particularly for home and adjacent vertical keys which account for 90% of the letters and spaces. As a result, entry rates are not effected by local variations in the frequency of individual letters and two-character combinations, due to statistical fluctuations or differences in the material being processed.

KEYBOARD GEOMETRY

The conformal orthogonal keyboard offers the advantages of vertical stroking, while retaining the spacial improvements of the ten-finger keyboard. Horizontal and vertical key positions are fixed in accordance with the architecture of the hand, so that individual strokes consist of simple motor movements from the home position. The association of vowels and consonants with opposite hands is reinforced by dividing the keyboard into separate halves. Curved key rows follow the shape of the hand. Straight key reaches from the home position expedite strokes to adjacent rows. Key tops of variable height compensate for variations in finger length and equalize strokes by different fingers. Inclined key tops on the upper letter row complement vertically oriented keys on the number and lower letter rows. Sloping key tops on the upper letter row and at the ends of the home row aid the return of the little and fourth fingers to their home position.

The orthogonal keyboard is split into two symmetric halves, one for each hand, as illustrated in FIG. 1: 11, 12. The half operated by the right hand is rotated clockwise about 15°; the half operated by the left hand is rotated counter-clockwise about 15°—so when fingers of each hand rest on their respective home keys 19, 20, 21, 22, 29, the forearm, wrist, and hand extending from the shoulder lie in a straight line on each side of the keyboard. This arrangement eliminates sources of muscular tension and magnifies the kinesthetic distinction between vowel and consonant strokes.

Key rows are set on curved convex arcs to follow the natural curvature of the hand (FIG. 1: 13, 14, 15, 16). Home keys 19, 20, 21, 22 on the home row 15 rest in trough. Key tops on the upper letter row 14 are inclined toward the home position. Stroking surfaces on the number row 13 and the lower letter row 16 are vertically oriented. Vertically oriented keys 25, 26, 27, 28, 29 on the lower letter row 16 and the thumb row 17 are represented in FIG. 1 by boxes with heavy curved lines to indicate the concave stroking surfaces.

Keys are arranged in adjacent rows so that when fingers resting on home keys are straightened, they pass over the center of keys on the inclined upper letter row 14 and strike the center of vertically oriented keys on the number row 13. When fingers resting on home keys are bent, they strike the concave center of vertically oriented keys on the lower letter row 16.

The thumb row 17 is inclined to follow the thumb from flexure to extension. When the thumb, which normally rests on its side on its home key 30, is flexed toward the palm, it strikes the vertically oriented thumb key 29 whose stroking surface mirrors the shape of the thumb striking this key. Other thumb keys, 31, 32, 33 slope toward the home thumb key, as illustrated by key 31 in FIG. 3. Keys alloted to other fingers cannot be mistakenly struck by the thumb because vertical keys on the lower letter row isolate the thumb from the rest of the keyboard. Similarly, other fingers cannot erroneously strike thumb keys because they are blocked by vertical keys on the lower letter row.

Figure 2:
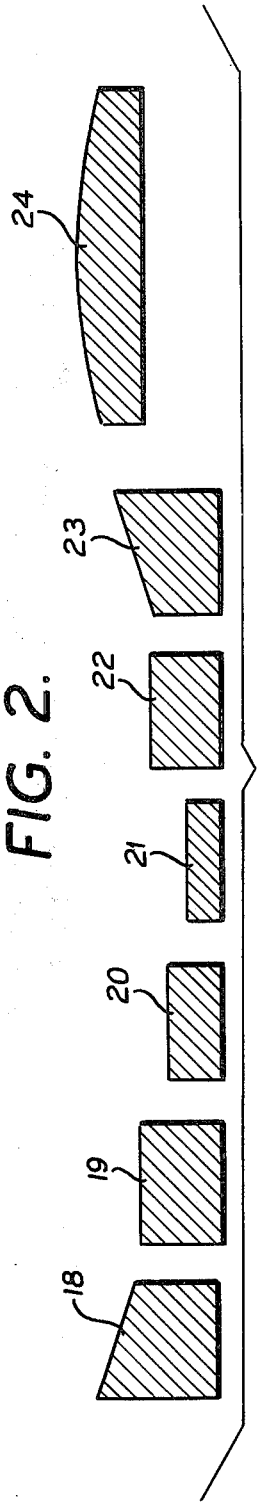
FIG. 2 is a cross-section through a home row taken along the line 2—2 of FIG. 1 illustrating the variable heights of key tops in a given row, and the inclined key tops outside the home position.

On the orthogonal keyboards of this invention, horizontal and inclined key tops on the home row and the upper letter row vary to compensate for differences in finger length, as illustrated in FIG. 2. The height of keys operated by the little finger 18, 19 are tallest, followed by keys operated by the fourth finger 22, 23, then by the second finger 20, and finally by the third finger 21.

Varying the height of individual fingers increases stroking speed and comfort, particularly for the little finger. Equalizing motor movements associated with individual fingers permits faster entry of one-hand digraphs when key-pairs are operated either simultaneously or sequentially fingers of the same hand. The variation of key heights on the home row supplies helpful tactile cues that enable operators to place their hands correctly on the home row without viewing the keyboard.

Stroking surfaces are inclined to facilitate input. (This is why vertical keys are described as vertically oriented.) Vertical keys on the number row slope away from the home row, as illustrated by key 24 in FIG. 4, to minimize the likelihood that finger nails will strike the number keys when they are stroked by a horizontal motion of extended finger tips from the home row. Vertically inclined surfaces on the number row also improve sight lines, aiding operators who use visual cues to enter numerical data.

Concave vertical stroking surfaces 25, 26, 27, 28 on the lower letter row 16 slope away from the home row 15, as illustrated by key 28 in FIG. 4. This slope makes more room available for bent fingers resting on the home row, and insures that the stroking force exerted when fingers are bent toward the palm will be perpendicular to the vertically oriented surfaces. Sloping surfaces also decrease the chance that fingers will accidently strike the upper edge of adjacent vertical keys. Finally, inclined keys 18, 23 on the outer and inner edge of the home row, and keys 36, 37 at the outer and inner edges of the upper letter row slope toward neighboring home keys, as illustrated by keys 18 and 23 in FIG. 2. These sloping keys expedite strokes at the edge of the keyboard, and assist the return of the little and fourth finger to their home position.

A code (or control) key is used on CRT terminals, word processing equipment, and other programmed devices to enable alphanumeric keys to transmit specialized instructions to the machine. For these keys to act in this mode, the code key must be depressed when these keys are struck. This process is simplified in this invention by setting the code key 24 in the center of the keyboard between the split key arrays, permitting the code key to be held down by the fourth finger of either hand. In addition, the code key can be readily identified kinesthetically because it has a raised cylindrical surface, as shown in FIG. 2.

Input keyboards on programmed devices contain function keys controlling the system. These keys 38, 39, 40, 41, are located in the center of the orthogonal keyboard, so they can be actuated by the fourth finger without moving hands from the home position, which is impossible on solid key arrays. Additional function keys may be accomodated in the middle of the keyboard by shifting the split key arrays further apart, without impairing the alignment between the curved key rows and hands resting on home keys. Finally, function keys at the outer edges of the keyboard may be placed next to the alphabetic keys, since the shift, tab, and carriage return keys are not at the outer boundary of the keyboard.

CHARACTER ARRANGEMENT

A copending patent application (Ser. No. 394,516) discusses the general principles of optimum keyboard design based on linguistic statistics. These principles secure rapid input by maximizing successive strokes on home keys and on alternate hands, and minimizing successive strokes by the same finger. Consonants are alloted to the right hand—and vowels, punctuation marks, diacritical signs, and rare consonants to the left hand. Five high frequency consonants are placed on the home keys of the right hand. The space and four high frequency vowels are set on the home keys of the left hand. Letters are arranged so common digraphs may be stroked by the thumb and another finger, or by adjacent fingers on the home row. Other characters ae distributed so that frequent sequences on the same hand may be stroked by simple motions. Digits are arranged on the number row so odd digits are keyed by the left hand, and even digits by the right hand.

Stroking patterns are governed by the two-character sequences (digraphs) occurring in the language. Their frequency may be determined by counting digraphs in a representative sample (100,000 letters and spaces). Such linguistic information is presented for the English language in Table 1, based on a computer count of one million words containing 5.7 million characters.

Determining the optimum letter arrangement on the orthogonal keyboards of this invention is simplified by the large number of easy stroking positions. 26 out of the 38 primary stroking positions outside the number row may be readily stroked. They consist of 10 home keys under the fingers; ten adjacent vertical keys; two keys at the inner edge of the home row operated by the fourth finger; and four keys on the upper letter row operated by the third and fourth fingers. In contrast, the standard keyboard with its horizontal key tops and straight key rows has only fifteen easily stroked keys distributed on nine fingers, since the left thumb is not used.

On orthogonal keyboards, a wide range of character sequences may be processed efficiently without impairing input rates because of the large number of easy stroking positions. Individual strokes are concentrated on home and adjacent vertical keys, since high frequency letters are assigned to home keys, and medium frequency letters to vertical keys. In English and major European languages, home-key characters account for about 75% of the letters and spaces in representative texts. Another 15% occur on adjacent vertical keys, so that approximately 90% of the characters occur on home and adjacent vertical keys that can be stroked quickly and accurately.

Characters are arranged in accordance with the strength and dexterity of individual fingers. More strokes are alloted to the thumb and fourth finger than to the weaker little and second fingers. Letters on each row are distributed to minimize the number of successive strokes by the same finger, and to permit common two-character sequences to be readily executed by the fingers of the same hand.

The same general procedure may applied to any alphabetic language whose digraph frequencies are known. The process is explained in detail for the English language using the linguistic data in Table 1. (The percentages given after individual letters are taken from the column totals of Table I; the numbers after specific digraphs record their frequency per 100,000 letters and spaces.)

The optimum character arrangement for the English language is shown in FIG. 1. The vowels $o$, $i$, $e$, and $a$ are assigned to the little, second, third, and fourth fingers of the left hand, respectively. This choice permits the digraphs io (447), ie (230), ei (109), and ea (472) to be stroked by adjacent fingers. The space key is set directly under the left thumb because it is the commonest character, and more words start or end with consonants than with vowels. The carriage return is alloted to the left thumb, since a carriage return replaces a space at the end of a line. The $u$ (2.3%) is assigned to the vertically oriented thumb key, since a $u$ seldom begins or ends a word. The $y$ (1.4%) is alloted to the second finger on the lower letter row because it rarely appears with the i. Employing vertical stroking surfaces permits the common digraphs ou (634) and y-space (1027) to be swiftly processed by sequential or simultaneous strokes.

Since one word in six ends in $e$—and a shift stroke follows a space—the shift is placed on the lower letter row, actuated by the same finger as the $e$ to reduce the number of successive strokes by the third finger. The period and comma are also on the lower letter row, since they are seldom preceded by an $a$ or an $o$. Setting the period and comma on vertical keys at the ends of the lower letter row makes it easy to remember the location of these keys.

The $j$ is assigned to the second finger of the left hand, and the $x$ to the fourth finger on the upper letter row, for swift entry of the digraphs space-j (95) and ex (122). The $z$ is at the outer edge of the home row, since it rarely combines with the o. The spacial separation of the $j$, $x$, and $z$, which are stroked by different fingers, reduces the likelihood that these rare characters will be mistakenly interchanged.

Similar considerations govern the placement of consonant keys on the right hand. The $n$ is the home thumb key because it forms many common digraphs with other consonants, including nc, nd, ng, ns, and nt. The $r$, $s$, $t$, and $h$ are keyed by the little, second, third, and fourth fingers, respectively, so the digraphs rs (270), st (720), and th (2337) may be struck by adjacent fingers. The $c$ (2.6%), $d$ (3.3%), and the $g$ (1.6%) are on vertical keys on the lower letter row to expedite entry of nc (244), ch (378), ct (247), nd (664), and ng (664). The $l$ (3.4%) is placed on the vertically oriented thumb key, because an $l$ rarely occurs with an $n$, and appears frequently in the digraphs ld (202) and bl (155). Finally, the $w$ (1.5%) is set on the upper letter row near the $h$ for rapid entry of wh (258).

The large number of easy stroking positions substantially lightens the kinesthetic load on the little finger. On the English language keyboard, each little finger is responsible for only one high frequency letter ($o$ on the left hand; $r$ on the right hand), and one medium frequency character (comma on the left hand; $g$ on the right hand). Each little finger is alloted two additional rare characters ($z$ and colon on the left hand; $q$ and double quotation marks on the right hand). Learning these rare characters is simplified because they are symmetrically located on opposite sides of the keyboard.

Digits on the number row are grouped in odd and even sequences keyed by the left and right hands, respectively. Assigning digits sharing a common characteristic (evenness and oddness) to a specific hand imitates the procedure of alloting letters possessing a common linguistic feature (vowels and consonants) to a specific hand. This arrangement allows each hand to be associated with a particular group of digits, which increases the speed of numerical input and shortens the time needed to learn the number row.

The orthogonal keyboard for the English language has thirty-eight primary stroking positions outside the number row. This enables the number row to be reduced from 12 to 10 keys, and permits the little finger to be responsible for only one rare character on the number row (slash by the left hand; one-half by the right hand). The digits zero and one are set at opposite ends of the upper letter row, reducing the reach required to strike these digits. Placing the zero and one closer to the home position is desirable, since these numbers occur twice as often as other digits.

CHORDING

Simultaneous operation of a pair of keys to produce a fixed output has been used for a long time on stenographic machines, telegraphic terminals, and chord typewriters to reduce the number of keys needed to generate a given set of characters. What is novel in this invention is the production of nearly all the common one-hand digraphs in a language by simultaneously actuating the two keys containing the characters in these digraphs.

A copending application (Ser. No. 394,516) discusses the advantages of employing chords to generate one-hand digraphs. On the ten-finger keyboard, high frequency digraphs are produced by chording a pair of home keys. On orthogonal keyboards, a much larger repertory of digraphs are generated by two-key chords. Excessive manual dexterity is not required because home keys and vertically oriented keys may be readily actuated at the same time. On the English language keyboard, ilustrated in FIG. 1, chords composed of a home key and a vertical key produce such common sequences as y-space, ou, nc, nd, ch, and ct.

Specific chords are easy to learn because their output coincides with keys struck simultaneously. Therefore they differ from chorded keyboards where the output of keys operated simultaneously is not directly related to the output produced when keys are struck sequentially. On the orthogonal keyboards of this invention, two possible digraphs can be produced by each keypair. The digraph actually generated is the one appearing more often in the language. Chorded digraphs may be readily identified because the frequency of successive characters differs sharply depending on their order, especially for vowel-vowel and consonant-consonant combinations. This follows from the phonetic origin of language.

Letters are connected with specific phonemes (sounds) that tend to occur more frequently in the beginning or end of words, and much more often in either the initial or terminal positions of vowel-vowel and consonant-consonant combinations. (In English, an e ends a word much more often than an e begins a word—and *ou*, *dn*, and *ch* appear far more frequently than *uo*, *dn*, or *hc*.) As a result, operators can readily associate the output of a specific chord with a particular digraph, and identify the output of a pair of successive characters appearing in a text they are processing as a digraph that may be chorded.

Since the movement of each hand is governed by a different part of the brain, grouping consonants on one side of the keyboard, and the space and vowels on the opposite side, make it easier to associate particular chords or individual key strokes with a specific hand. Left hand motions are controlled by the right hemisphere of the brain—right hand motions by the left hemisphere of the brain—so that strokes made by each hand may be processed independently. One hand can prepare for a stroke while the other hand is striking a key. This cerebral division of motor activity provides the neurological basis for chain stroking in which the fingers of one hand prepare for a stroke while the fingers of the other hand are completing a stroke. Such parallel cerebral processing explains why successive strokes may be executed more rapidly by alternate hands than by the same hand.

On the orthogonal keyboards of this invention, characters are arranged to maximize alternate-hand strokes. This alternation is increased by employing one-hand chords to generate frequent digraphs composed of characters on the same side of the keyboard. Triple strokes by the same hand rarely occur on English and Romance language keyboards because of the predominant alternation of vowels and consonants. For practical purposes, such triple strokes may be neglected—and finger motions treated as a series of alternate-hand sequences composed of single key strokes and one-hand chords. (This approximation may also be adopted for German, Swedish, and Dutch, even though more one-hand trigraphs occur in these languages.)

The prevalence of alternate-hand motions permits cerebral control to switch back and forth between opposite hemispheres of the brain, with only one hemisphere engaged at a time. Such parallel processing is impossible on chord typewriters and stenographic machines whose chords consist of keys located on opposite sides of the keyboard.

On the keyboards of this invention, letters are arranged so most strokes lie on home keys, and most successive strokes are on alternate hands. As a result, fingers follow a fixed geometric trajectory, starting from a home position to strike individual keys or key-pairs. Since this trajectory is essentially independent of preceding characters, each chord may be learned as a distinct, invariant kinesthetic motion executed by fingers of the same hand.

Chorded digraphs are seldom mistaken for reverse digraphs, since the frequency of vowel-pairs and consonant-pairs differ greatly depending on the order of the letters. Furthermore, a relatively small number of two-character combinations account for a large proportion of the one-hand digraphs appearing in representative texts. This agrees with fundamental principles of information theory (as explained in a copending patent application) which require that individual letters and digraphs appear with varying frequency in order for character sequences to transmit information efficiently.

These conclusions may be verified for languages whose digraph frequencies are known. In particular, they may be confirmed for the English language. The ratio of chorded to reverse digraphs is given below for the English language keyboard illustrated in FIG. 1. The frequency of chorded digraphs (per 100,000 letters and spaces) is recorded in the numerator; the frequency of serially stroked digraphs in the denominator. These digraphs are grouped according to their frequency and distribution on the keyboard. (In these ratios, the space is represented by a hyphen.)

Left Hand Digraphs $$T \& H: \frac{e-}{-e} = \frac{3524}{426} \quad \frac{-a}{a-} = \frac{2010}{498} \quad \frac{-o}{o-} = \frac{1248}{737} \quad \frac{-i}{i-} = \frac{1187}{106}$$

$$H \& H: \frac{ea}{ae} = \frac{472}{6} \quad \frac{io}{oi} = \frac{447}{57} \quad \frac{ie}{ei} = \frac{230}{109}$$

$$H \& V: \frac{y-}{-y} = \frac{1027}{147} \quad \frac{ou}{uo} = \frac{634}{7} \quad \frac{ay}{ya} = \frac{170}{12} \quad \frac{yo}{oy} = \frac{109}{26}$$

$$H \& I: \frac{ex}{xe} = \frac{122}{11} \quad \frac{j-}{-j} = \frac{95}{2}$$

Double Letters: ee = 271: oo = 178

Right Hand Digraphs $$T \& H: \frac{nt}{tn} = \frac{618}{6} \quad \frac{ns}{sn} = \frac{294}{15} \quad \frac{rn}{nr} = \frac{107}{2}$$

$$H \& H: \frac{th}{ht} = \frac{2337}{103} \quad \frac{st}{ts} = \frac{720}{205} \quad \frac{rs}{sr} = \frac{270}{2} \quad \frac{sh}{hs} = \frac{235}{8}$$

$$H \& V: \frac{nd}{dn} = \frac{851}{19} \quad \frac{ng}{gn} = \frac{644}{39} \quad \frac{ch}{hc} = \frac{378}{2} \quad \frac{ct}{tc} = \frac{247}{27}$$

$$\frac{nc}{cn} = \frac{244}{1} \quad \frac{gh}{hg} = \frac{176}{0}$$

$$H \& I: \frac{pr}{rp} = \frac{268}{27} \quad \frac{wh}{hw} = \frac{258}{3} \quad \frac{fr}{rf} = \frac{138}{20} \quad \frac{sp}{ps} = \frac{120}{35}$$

-continued $$V \& I: \quad \frac{pl}{lp} = \frac{166}{14} \quad \frac{bl}{lb} = \frac{155}{5} \quad \frac{mp}{pm} = \frac{136}{11} \quad \frac{ck}{kc} = \frac{110}{0}$$

$$V \& V: \quad \frac{ld}{dl} = \frac{202}{28} \quad \frac{cl}{lc} = \frac{97}{6}$$

Double Letters: 11 = 417; ss = 250; tt = 128; pp = 99; ff = 92

In this list of chords and reverse digraphs, T refers to a thumb character (space or $n$), H stands for a home key character, V for a letter on a vertically oriented key, and I for a letter on an inclined key. The digraphs e-period and e-comma, produced by chording a home and a vertically oriented key, should be added to this list of chords, since a period or a comma is attached to about one word in ten in typical texts, so that each of these digraphs appears about 170 times in every 100,000 characters.

The digraph ratios listed above reveal that chorded digraphs (in the numerator) occur far more often than reverse digraphs (in the denominator). Consequently chorded digraphs are not confused kinesthetically with serially stroked reverse digraphs. The ratio of these digraphs is less than three in only two cases: (ie/ei) and (–o/o–). In other cases, the ratio is much greater, so that chorded and reverse digraphs are clearly distinguished. Only one key-pair ($r$, $t$) is not chorded because a pair of comparable digraphs [$tr$ (255) and $rt$ (225)] may be generated by the same pair of keys.

The more agile right hand executes more chords than the left hand. According to the list of chords given above, the left hand is responsible for 15 chords: nine on two home keys, and six involving one home key. The right hand is responsible for twenty-eight chords, or almost twice as many. Nine of the right hand chords are on two home keys; ten involve one home key; and nine are independent of the home keys.

Chords are utilized, even for digraphs of moderate frequency, because chording does not effect serial operation of the keyboard. Chording leads to faster input and greater accuracy. Each chord generates two characters and replaces two separate finger motions. Common chords are produced by striking a pair of keys at the same time, which is simpler than ordering two separate strokes temporally. Chording also reduces exchange errors during rapid input when a pair of keys are struck almost simultaneously in the wrong order. The chorded output under these conditions corresponds in most cases to the correct character sequence, since the chorded digraph appears much more often than the reverse digraph.

Although 389 one-hand digraphs could be theoretically formed from the arrangement of space and letter keys shown in FIG. 1 for the orthogonal English keyboard, 149 of these digraphs occur less than once in every 70,000 characters. Only about sixty of the possible one-hand digraphs appear with substantial frequency, and most of these digraphs may be chorded. Although about four dozen keypairs are chorded, a dozen of these chords account for two-thirds of the chorded digraphs and half of the one-hand digraphs in representative texts. Therefore mastering a small number of chords significantly increases input rates.

On the keyboards of this invention, the dash, which is a common punctuation mark represented by two hyphens, is generated by holding down the hyphen key. Double letters are produced automatically by holding down the corresponding letter key. Producing double letters by depressing a letter key is faster than striking a letter twice with the same finger. Because of its simplicity, this procedure of generating double letters is employed for the entire alphabet (with the possible exception of the $x$ which may be made a repeat key). This method may be mastered by practicing a few specific double letter combinations—since the same procedure is used for the whole alphabet, and experimental studies reveal that operators mentally encode double letters as a single linguistic unit.

One-hand digraphs are produced by holding down a key to generate a double letter, or by striking a pair of keys simultaneously to produce a digraph containing two different characters. Since characters are converted into coded signals on electronic keyboards, chording essentially determines the order in which a pair of characters are recorded by the system. Special coding of individual strokes is not needed, since the keys of both characters in the digraph are actuated at the same time to complete the chord. This simplifies the circuitry required on the keyboards of this invention, and permits chord stroking to be added to keyboards originally designed for serial input.

The keyboard must be buffered, however, to enable the machine to determine whether a pair of key strokes should be recognized as a single chord or a pair of separate strokes. If two strokes occur within a given time interval, the strokes are treated as a single chord. The resulting time delay does not lower processing rates as long as the sum of the time delay and the mean character input time is less than the machine output time for successive characters.

Vertically oriented keys allow frequent one-hand digraphs to be readily processed by successive strokes. Therefore the orthogonal configuration may be efficiently employed on devices, such as electric typewriters, where keys are operated serially. Swift input is encouraged because the full stroking capacity of all ten fingers is utilized—and characters are distributed to maximize alternate-hand strokes on home and adjacent vertical keys.

Individuals trained on serial keyboards can operate chorded keyboards by stroking keys sequentially. They can also quickly learn the chords employed on electronic keyboards, since these chords consist of key-pairs containing the characters occurring in common digraphs. Conversely, individuals trained on chorded keyboards can operate serial keyboards, if these keyboards are provided with an interlock that prevents more than one key from being struck at time.

THE PROGRAMMED KEYBOARD

The keyboards of this invention are designed to transmit programmed instructions to a machine in response to a single key or chord stroke when these keyboards are attached to sophisticated devices such as CRT terminals, electronic typewriters, word processing equipment, and computer input stations. The electronic circuitry of these devices can convert key strokes into a desired output, and simplify the entry of linguistic information by replacing repetitive sequences executed by human operators with machine commands completed automatically.

Orthogonal keyboards utilize a single shift to produce uppercase characters. This shift key, which is assigned to the third finger (except for German and Italian), acts on a single character and automatically returns the system to lower-case operation after an upper-case character has been generated. This allows shift and upper-case character keys to be stroked sequentially. A shift key acting on a single character is effective because a lower-case character nearly always follows an upper-case character. (An exception occurs in Spanish where sentences may start with an inverted question mark, or exclamation point.) Since most capitals are consonants, the shift key is located on the vowel side of the keyboard. This in turn indicates that common upper-case symbols on the number row ($, %, =) should be placed on the opposite side of the keyboard so they can be entered by alternate-hand strokes.

Capitals may be inputed rapidly because there is only one shift key, and the sequence (space, shift) can be easily completed by the thumb and third finger of the left hand. A single shift is sufficient to produce upper-case characters on electric typewriters that employ orthogonal stroking surfaces and the optimum letter arrangements of this invention. If the shift key disengages after each stroke, the shift and capital keys may be struck serially. If a conventional key is retained, the third finger can depress the shift key while another finger strikes an upper-case character.

On the programmed keyboards of this invention, a single stroke replaces the fixed sequence occurring after certain punctuation marks. An example is the transition from one sentence to another, which usually requires a period, two spaces, and a shift. These four strokes are generated automatically by a lower-case period—eliminating three superfluous strokes. The period needed in decimals and abbreviations is generated by an upper-case period, which can be produced readily on the English keyboard by two serial strokes, since the shift and period lie side by side on vertical keys on the lower letter row.

Actuating the lower-case comma, colon, or semicolon keys automatically generates a space after each of these punctuation marks. The comma required in numbers and quotations is generated by stroking an upper-case comma, or by striking the back space key (which can also delete the space after a colon or a semicolon).

A single chord replaces the fixed sequence of strokes needed to go from one paragraph to another. The chord (shift, period) actuated by the third and fourth fingers produces the sequence (period, carriage return, tab, and shift). This chord may be readily stroked because the shift and period keys lie side by side. A different chord (period, comma) executed by the little and fourth fingers produces the sequence (period, two carriage returns, and a shift) required to pass from one paragraph to another in single-spaced business letters. These two chords are easy to remember because they involve simultaneous operation of the period key and another vertical key on the lower letter row.

The carriage return key does not have to be struck at the end of each line on the orthogonal keyboard. When a space or hyphen key is actuated within a given number of spaces from the end of a line (which may be varied), the machine automatically generates a carriage return. Therefore the thumb does not have move from its home position to strike the carriage return key, which is usually necessary every 60 to 75 characters on conventional keyboards. This automatic carriage return may be deactivated by operating the margin release key to permit data input to continue to the end of the line.

Characters are stored internally in the machine (rollover) and played out after the system has passed from one line to the begining of the next one. This avoids the danger of losing characters while the machine is changing lines, and allows operators to continue keyboarding while the system is shifting lines. Internal character storage, which is often utilized on electronic keyboards, enables a chord to be entered by one hand while the machine is processing a chord stroked by the opposite hand. Since each chord produces two or more characters, internal storage allows input to approach maximum machine output when these rates are comparble.

The amount of programming employed will depend on the device to which the keyboard is attached. Programming requirements differ for CRT terminals, electronic typewriters, word processing equipment, paper tape perforators, and computer input stations. Likewise, the electronic means of translating chords into multiple characters will vary, depending on the device attached to the keyboard. However, programming may be readily incorporated on orthogonal keyboards because only a limited set of simple instructions are utilized.

NUMERICAL ANALYSIS

The distribution of stroking motions on the English language keyboard may be determined from the digraph frequencies recorded in Table 1. It follows from these frequencies that 75.2% of the letters and spaces lie on home keys directly under the fingers; another 16.5% are on adjacent vertical keys; and 8.2% on remaining letter keys. Out of this 8.2%, only 3.1% lie on keys which may be awkward to strike, while 5.1% are on easily stroked keys. Consequently assigning characters to all ten fingers on orthogonal stroking surfaces insures that most keys will be readily actuated. This conclusion is reinforced because these figures do not include period, comma, and shift strokes, which occur on adjacent vertical keys that can be struck by simply bending fingers toward the palm.

Vertically oriented stroking surfaces permit a large group of one-hand digraphs to be chorded. The distribution of these chords in different rows is tabulated in Table 2. Although these one-hand digraphs account for 31.9% of the letters and spaces, three-fourths of these digraphs (24.2%) can be chorded. Only a fourth (7.7%) require sequential strokes by fingers of the same hand. As a result, only one digraph in 13 must be generated by striking two keys in succession on the same side of the keyboard, which is slower than a chord or a pair of alternate-hand strokes.

Chords and serial strokes are almost evenly divided between the left and right hands—mirroring the even division of individual letters and spaces on the two hands. Although both hands essentially execute the same number of chord and serial strokes, Table 2 reveals that the more agile right hand performs a much wider range of motions. A dozen consonants assigned to the right hand occur with substantial frequency, whereas only the space and five vowels appear often on the left hand.

Left hand chords on two home keys account for 9.6% of the letters and spaces; 2.5% involve one home key; and none are on two outside keys. Serial strokes include 2.4% on two home keys; 2.5% involve one home key; and only 0.1% are on two outside keys. Consonant digraphs processed by the right hand exhibit a much greater variety of motions. Right hand chords on two home keys account for 5.0% of the letters and spaces; 5.9% involve one home key, and 0.4% are on two outside keys. Serial strokes include 0.9% on two home keys; 2.5% involve one home key; and 0.4% are on two outside keys.

Each chord generates two characters by a single kinesthetic movement. Since chording produces 24% of the letters and spaces on the orthogonal keyboard, chording eliminates a quarter of the separate stroking actions required on a conventional keyboard. Additional strokes are eliminated by actuating the lower-case comma and period keys to produce a comma followed by a space, and a period followed by two spaces and a shift, respectively. Consequently chording leads to faster input by reducing the number of separate stroking responses and decreasing the time required to complete individual motions.

FOREIGN LANGUAGE KEYBOARDS

The procedure used to determine the optimum character arrangement on the orthogonal English keyboard can be applied to other alphabetic languages. Since the method has been described in detail for English, only selected features will be noted for the foreign keyboards illustrated in FIGS. 5 through 11.

Diacritical marks are generated by "dead" keys that produce the diacritical marks, but do not advance the system in the horizontal direction. Using a separate key for each diacritical sign allows these signs to combine with a variety of letters and reduces the number of keys needed. Letters with diacritical signs are generated by operating the corresponding diacritical and letter keys as chords, or by stroking them serially. Capitals containing a diacritical mark may be entered by a single shift stroke, since upper-case diacritical keys do not return the system to the lower case. Similarly, a single shift stroke is sufficient for interrogatory or exclamatory sentences in Spanish because the inverted question mark or inverted exclamation point appearing at the beginning of these sentences do not return the system to lower-case operation.

Determining the optimum letter arrangement is simplified by the presence of vertically oriented keys adjacent to the home keys. Individual letter frequencies essentially determine the row on which a letter appears. High frequency characters are set on home keys, medium frequency letters on adjacent vertical keys, and low frequency characters on remaining keys. The distribution of letters on a given row is governed by one-hand digraph frequencies in the language, since characters are arranged to minimize successive strokes by the same finger and to facilitate chording one-hand digraphs. Table 2 lists some of the principal one-hand digraphs on orthogonal keyboards for German, French, Italian, Spanish, Portuguese, Swedish, and Dutch.

Approximately 75% of the characters on these keyboards lie on home keys—and about 15% on adjacent vertical keys—so that nine out of ten characters are concentrated on home and adjacent vertical keys. This concentration is due to the similarity in the cumulative frequency distribution of ranked characters in major European languages. This similarity is exhibited in a copending patent application, which tabulates the frequency of leading characters in six European languages. The cumulative frequency of the ten home-key characters in these languages differ by only a few percent, reflecting their common linguistic ancestry and their evolution as efficient alphabetic codes transmitting information.

On the orthogonal keyboard, individual letter frequencies and major one-hand digraphs determine the basic character arrangement. The large number of easy stroking positions enables a wide variety of sequences to be accomodated effectively. Diacritical signs, which are common in the Romance languages (French, Italian, Spanish, and Portuguese), are placed on the vowel side of the keyboard so that vowels appearing with diacritical signs may be readily processed.

Orthogonal stroking surfaces permit rapid entry of the numerous consonant-consonant digraphs occurring in German, Swedish, and Dutch. Most of these digraphs are efficiently processed by chord or sequential strokes on horizontal home keys and adjacent vertical keys. Thus the $c$ and the $h$ in German are on vertical keys actuated by the third and fourth fingers of the right hand—allowing operators to chord the frequent digraph $ch$ by bending their fingers toward the palm, and to enter the important trigraphs sch and cht by chording the ch and striking the horizontal $s$ or $t$ key.

Many European languages contain extremely rare letters that appear only in words of foreign origin. The $k$ and $w$ are examples in the Romance languages. Such rare letters are listed in Table 2. While it is desirable to include these very rare letters on foreign keyboards, they occur so infrequently (less than 0.1% each) that their location on the keyboard does not effect entry rates. Consequently these letters are not shown on the foreign language keyboards illustrated in FIGS. 5 through 11.

The statistical properties of character sequences fix the optimum letter arrangement on foreign orthogonal keyboards. Variations in the letter and digraph frequencies account for differences in keyboard arrangement. Since nearly all Italian words end in vowels, the period and comma keys are grouped with the consonants on the Italian keyboard to increase the number of strokes on alternate hands. The shift key in Italian is alloted to a vertical key operated by the fourth finger to enable the accent acute (´) and the accent grave (`) to be actuated by the third finger. This choice allows these diacritical marks to be readily combined with the i and the e stroked by the second and third fingers, respectively.

The umlaut (¨) in Swedish is on a vertical thumb key because it appears more often than the u. The umlaut in German is on a vertical key assigned to the same finger as the e, because the umlaut does not occur with the e. Since all nouns are capitalized in German, the shift key is on a vertical key operated by the fourth finger. This permits the frequent sequence (space, shift) to be chorded by the thumb and fourth finger, which is desirable due to the large number of capitals in German.

Such considerations govern the distribution of letters and symbols on the foreign keyboards of this invention. The orthogonal configurations shown in FIGS. 5 through 11 have been derived by applying linguistic statistics and the kinesthetic principles outlined for the English keyboard—leading to keyboards that minimize finger motions and maximize input rates.

KEYBOARD TRAINING

Since a keyboard is an interface between a human operator and a machine, the efficiency of a new key arrangement depends on the ease that operators of average ability can master the keyboard and attain high entry rates. A copending patent application describes how instruction can capitalize on the motor independence of finger motions on optimum keyboards by practicing simple movements separately, and then combining these motions to process representative texts. These training methods may be significantly extended on the keyboards of this invention, since orthogonally oriented key surfaces provide a closer fit between stroking motions and the functional structure of the hand. This congruence eliminates the necessity of mastering complex muscular movements, and allows instruction to concentrate on reinforcing associations between visual stimuli and digital responses.

Practice exercises can focus initially on alternate-hand strokes on horizontal home keys and adjacent vertically oriented keys, beginning with keys at the edge of the hand operated by the thumb, fourth, and little fingers that are easiest to distinguish kinesthetically—and progress to keys in the middle of the hand operated by the second and third fingers. Since home and adjacent vertical keys account for 90% of the letters and spaces in typical texts, mastery of these keys leads to rapid acquisition of keyboard facility.

Chords may be learned quickly after individual key strokes have been mastered, since they consist of simultaneously actuating a pair of conveniently located keys containing the characters in common digraphs. Arbitrary key combinations do not have to be memorized—and the number of chords learned can be increased gradually as input rates rise, since digraphs of moderate frequency may be generated by striking the appropriate keys sequentially.

Training methods developed for English may be utilized on the foreign keyboards of this invention, because the distribution of individual key strokes is similar on these keyboards. Exercises can begin with home and adjacent vertical keys, proceed to other keys, and conclude with chord strokes. Training exercises may be partitioned according to the kinesthetic motions involved, permitting stroking responses to be mastered swiftly and efficiently.

Table 1

English Digraph Frequencies per 100,000 Letters and Spaces

| First | Second — | a | b | c | d | e | f | g | h |
|---|---|---|---|---|---|---|---|---|---|
| — | | 0 | 2010 | 805 | 843 | 528 | 426 | 714 | 300 | 949 |
| a | 498 | 1 | 140 | 286 | 284 | 6 | 46 | 132 | 8 |
| b | 19 | 109 | 10 | 0 | 1 | 389 | 0 | 0 | 0 |
| c | 92 | 331 | 0 | 41 | 0 | 396 | 0 | 0 | 378 |
| d | 1835 | 104 | 2 | 1 | 32 | 478 | 1 | 20 | 3 |
| e | 3524 | 472 | 15 | 275 | 813 | 271 | 96 | 72 | 16 |
| f | 750 | 111 | 0 | 0 | 0 | 150 | 92 | 0 | 0 |
| g | 546 | 100 | 1 | 0 | 1 | 240 | 1 | 20 | 176 |
| h | 472 | 653 | 4 | 2 | 1 | 2139 | 1 | 0 | 1 |
| i | 106 | 151 | 55 | 419 | 220 | 230 | 126 | 175 | 1 |
| j | 2 | 17 | 0 | 0 | 0 | 29 | 0 | 0 | 1 |
| k | 163 | 13 | 1 | 0 | 0 | 181 | 2 | 1 | 3 |
| l | 556 | 322 | 5 | 6 | 202 | 555 | 41 | 4 | 1 |
| m | 297 | 362 | 61 | 3 | 0 | 519 | 3 | 1 | 0 |
| n | 1530 | 196 | 3 | 244 | 851 | 481 | 34 | 664 | 7 |
| o | 737 | 50 | 62 | 97 | 121 | 29 | 686 | 52 | 16 |
| p | 108 | 197 | 0 | 0 | 0 | 302 | 1 | 0 | 53 |
| q | 0 | 0 | 0 | 0 | 0 | 0 | 0 | 0 | 0 |
| r | 1030 | 408 | 17 | 67 | 124 | 1168 | 20 | 60 | 12 |
| s | 2248 | 153 | 6 | 93 | 5 | 558 | 9 | 1 | 235 |
| t | 1641 | 331 | 2 | 27 | 1 | 749 | 5 | 1 | 2337 |
| u | 66 | 77 | 57 | 108 | 59 | 85 | 12 | 94 | 1 |
| v | 6 | 75 | 0 | 0 | 0 | 534 | 0 | 0 | 0 |
| w | 160 | 327 | 1 | 0 | 3 | 247 | 1 | 0 | 258 |
| x | 22 | 15 | 0 | 16 | 0 | 11 | 0 | 0 | 2 |
| y | 1027 | 12 | 6 | 6 | 3 | 77 | 1 | 1 | 1 |
| z | 5 | 14 | 0 | 0 | 0 | 35 | 0 | 1 | 0 |
| Totals | 17,607 | 6,627 | 1,264 | 2,561 | 3,269 | 10,294 | 1,922 | 1,607 | 4,479 |

| First | Second i | j | k | l | m | n | o | p | q |
|---|---|---|---|---|---|---|---|---|---|
| — | 1187 | 95 | 88 | 414 | 693 | 378 | 1248 | 687 | 34 |
| a | 230 | 6 | 75 | 649 | 185 | 1270 | 3 | 117 | 1 |
| b | 66 | 11 | 0 | 155 | 2 | 0 | 142 | 0 | 0 |
| c | 155 | 0 | 110 | 97 | 1 | 1 | 488 | 0 | 2 |
| d | 291 | 4 | 0 | 28 | 11 | 19 | 138 | 1 | 1 |
| e | 109 | 3 | 16 | 349 | 232 | 907 | 42 | 107 | 29 |
| f | 181 | 0 | 0 | 42 | 0 | 0 | 322 | 0 | 0 |
| g | 96 | 0 | 0 | 40 | 4 | 39 | 99 | 0 | 0 |
| h | 563 | 0 | 0 | 9 | 8 | 18 | 342 | 1 | 0 |
| i | 1 | 1 | 39 | 299 | 218 | 1554 | 447 | 57 | 8 |
| j | 2 | 0 | 0 | 0 | 0 | 0 | 38 | 0 | 0 |
| k | 71 | 0 | 1 | 10 | 1 | 40 | 7 | 1 | 0 |
| l | 402 | 0 | 19 | 417 | 20 | 4 | 254 | 14 | 0 |
| m | 207 | 0 | 0 | 3 | 59 | 6 | 225 | 136 | 0 |
| n | 221 | 7 | 40 | 47 | 15 | 62 | 295 | 4 | 3 |
| o | 57 | 4 | 52 | 232 | 356 | 1071 | 178 | 141 | 1 |
| p | 88 | 0 | 1 | 166 | 11 | 0 | 214 | 91 | 0 |

Table 1-continued

English Digraph Frequencies per 100,000 Letters and Spaces

|   | q | r | s | t | u | v | w | x | y | z |
|---|---|---|---|---|---|---|---|---|---|---|
| q | 0 | 0 | 0 | 0 | 0 | 0 | 0 | 0 | 0 | |
| r | 436 | 0 | 62 | 65 | 102 | 107 | 471 | 27 | 1 | |
| s | 345 | 0 | 33 | 45 | 45 | 15 | 251 | 120 | 7 | |
| t | 753 | 0 | 0 | 75 | 20 | 6 | 713 | 2 | 0 | |
| u | 67 | 0 | 1 | 226 | 81 | 271 | 7 | 94 | 0 | |
| v | 157 | 0 | 0 | 0 | 0 | 0 | 41 | 0 | 0 | |
| w | 261 | 0 | 1 | 9 | 1 | 62 | 163 | 1 | 0 | |
| x | 18 | 0 | 0 | 0 | 0 | 0 | 2 | 42 | 0 | |
| y | 22 | 0 | 1 | 9 | 15 | 8 | 109 | 13 | 0 | |
| z | 9 | 0 | 0 | 2 | 0 | 0 | 4 | 0 | 0 | |
| Totals | 6,001 | 137 | 544 | 3,405 | 2,095 | 5,845 | 6.255 | 1,666 | 89 | |

| First \ Second | r | s | t | u | v | w | x | y | z |
|---|---|---|---|---|---|---|---|---|---|
| — | 456 | 1210 | 2783 | 203 | 113 | 1068 | 1 | 149 | 4 |
| a | 692 | 608 | 927 | 73 | 137 | 44 | 14 | 170 | 11 |
| b | 74 | 24 | 9 | 142 | 4 | 0 | 0 | 100 | 0 |
| c | 93 | 12 | 247 | 82 | 0 | 0 | 0 | 21 | 0 |
| d | 65 | 79 | 1 | 79 | 11 | 5 | 0 | 40 | 0 |
| e | 1323 | 788 | 280 | 15 | 170 | 86 | 122 | 111 | 3 |
| f | 138 | 2 | 55 | 63 | 0 | 0 | 0 | 5 | 0 |
| g | 131 | 34 | 12 | 49 | 0 | 0 | 0 | 10 | 0 |
| h | 58 | 8 | 103 | 53 | 0 | 3 | 0 | 30 | 0 |
| i | 297 | 720 | 722 | 7 | 164 | 0 | 13 | 0 | 41 |
| j | 1 | 0 | 0 | 43 | 0 | 0 | 0 | 0 | 0 |
| k | 2 | 30 | 1 | 2 | 0 | 2 | 0 | 7 | 0 |
| l | 8 | 82 | 69 | 83 | 20 | 9 | 0 | 301 | 0 |
| m | 25 | 60 | 1 | 82 | 0 | 0 | 0 | 39 | 0 |
| n | 6 | 294 | 618 | 49 | 28 | 4 | 2 | 73 | 2 |
| o | 805 | 184 | 277 | 634 | 124 | 233 | 9 | 26 | 3 |
| p | 268 | 35 | 54 | 64 | 0 | 1 | 0 | 6 | 0 |
| q | 0 | 0 | 0 | 87 | 0 | 0 | 0 | 0 | 0 |
| r | 72 | 270 | 225 | 82 | 39 | 8 | 0 | 151 | 1 |
| s | 2 | 250 | 720 | 184 | 1 | 21 | 0 | 31 | 0 |
| t | 255 | 205 | 128 | 149 | 0 | 50 | 0 | 132 | 3 |
| u | 325 | 292 | 288 | 1 | 2 | 0 | 3 | 4 | 2 |
| v | 0 | 1 | 0 | 1 | 0 | 0 | 0 | 4 | 0 |
| w | 22 | 20 | 4 | 1 | 0 | 0 | 0 | 2 | 0 |
| x | 0 | 0 | 27 | 2 | 0 | 0 | 0 | 2 | 0 |
| y | 7 | 58 | 14 | 1 | 0 | 4 | 0 | 0 | 1 |
| z | 0 | 0 | 0 | 1 | 0 | 0 | 0 | 2 | 6 |
| Totals | 5,051 | 5,394 | 7,621 | 2,237 | 821 | 1,548 | 164 | 1,420 | 79 |

Table 2

Percentage of Chords and One-Hand Serial Strokes on the Orthogonal English Keyboard

| Keys | Left Hand | | | Right Hand | | | Both Hands | | | Total |
|---|---|---|---|---|---|---|---|---|---|---|
| | No. | Chords | S.S. | No. | Chords | S.S. | No. | Chords | S.S. | |
| H & H | 9 | 9.44 | 2.44 | 9 | 4.96 | .92 | 18 | 14.53 | 3.36 | 17.89 |
| H & V | 4 | 1.94 | 1.00 | 6 | 5.09 | 1.56 | 10 | 7.03 | 2.56 | 9.59 |
| H & I | 2 | .22 | .34 | 4 | .78 | .92 | 6 | 1.00 | 1.26 | 2.26 |
| O & O | 0 | .01 | .05 | 9 | 1.64 | .44 | 9 | 1.64 | .49 | 2.13 |
| Total | 15 | 11.73 | 3.83 | 28 | 12.47 | 3.84 | 43 | 24.20 | 7.67 | 31.88 |

(S.S. stands for the percentage of serial strokes on the same hand, No. for the number of significant chords, H for home keys, V for adjacent vertical keys, I for inclined keys, and O for vertical and adjacent keys.)

Table 3

Very Rare Letters and Leading One-Hand Digraphs on Foreign Orthogonal Keyboards

| | Rare Letters | Left Hand | Right Hand |
|---|---|---|---|
| Dutch | q, x, y | aa, ee, oo, oe<br>ie, ei | st, nd, ng, ns<br>sc, ch, rd, jd |
| French | k, w | á, é, 'a, 'e, ai<br>ie, eu, ou, e-space | nt, tr, nd, ch<br>cl, dr, pr, ps |
| German | j, q<br>x, y | ä, ü, au, ei, ie<br>shift-space, e-shift | ch, nd, st, sc<br>tr, ng, zw |
| Italian | j, k, w<br>x, y | ia, ie, io, a-space<br>e-space, i-space, o-space | nt, ch, st, tr<br>nd, sc, pr |
| Portuguese | k, x, y | ã, ao, ia, ie<br>ei, ue | st, nt, tr, pr<br>lh, nd, ch |
| Spanish | k, w | í, ó, ia, ie, io, ue<br>a-space, o-space | nt, st, br, gr<br>pr, rd, rt |
| Swedish | q, w, z | ä, ö, a-space<br>e-space | st, nt, nd, rt<br>tt, mm, ll, nn |

I claim:

1. An input keyboard for the transfer of information to a machine by a human operator, comprising:

a plurality of keys arranged in transversely oriented key rows as viewed by the operator: a number key row being situated at the greatest distance from the operator; an upper letter key row being situated closer to the operator than the number key row; a home key row being situated closer to the operator than the upper letter key row; a lower letter key row being situated closer to the operator than the home key row; and a thumb key row being situated closer to the operator than the lower letter key row;

wherein the home key row comprises twelve keys: six keys on the left hand side of the keyboard as viewed by the operator, and six keys on the right hand side of the keyboard as viewed by the operator;

wherein the lower letter row comprises eight keys: four keys on the left hand side of the keyboard as viewed by the operator, and four keys on the right hand side of the keyboard as viewed by the operator;

wherein the thumb row comprises six keys: three keys on the left hand side of the keyboard as viewed by the operator, and three keys on the right hand side of the keyboard as viewed by the operator;

wherein the keys on the home row are designated in serial order along the home key row as viewed by the operator from the outer edge of the keyboard to the center of the keyboard as follows: on the left hand side of the keyboard as viewed by the operator—the first home key, the second home key, the third home key, the fourth home key, the fifth home key, and the sixth home key, respectively; and on the right hand side of the keyboard as viewed by the operator—the seventh home key, the eighth home key, the ninth home key, the tenth home key, the eleventh home key, and the twelfth home key, respectively;

wherein the keys on the lower letter key rows are designated in serial order along the lower letter key row as viewed by the operator from the outer edge of the keyboard to the center of the keyboard as follows: on the left hand side of the keyboard as viewed by the operator—the first lower letter key, the second lower letter key, the third lower letter key, and the fourth lower letter key; and on the right hand side of the keyboard as viewed by the operator—the fifth lower letter key, the sixth lower letter key, the seventh lower letter key, and the eighth lower letter key;

wherein the keys on the thumb key row are designated in serial order along the thumb row as viewed by the operator from the outer edge of the keyboard to the center of the keyboard as follows: on the left hand side of the keyboard as viewed by the operator—the first thumb key, the second thumb key, and the third thumb key; and on the right hand side of the keyboard as viewed by the operator—the fourth thumb key, the fifth thumb key, and the sixth thumb key;

wherein space and letter keys are arranged on the left hand side of the keyboard as viewed by the operator as follows:

the space key, which generates the separation between words, is assigned to the second thumb key; one high frequency vowel is assigned to the second home key; a second high frequency vowel is assigned to the third home key; a third high frequency vowel is assigned to the fourth home key;

and a fourth high frequency vowel is assigned to the fifth home key; wherein each of these four high frequency vowels is a different letter;

wherein letter keys are arranged on the right hand side of the keyboard as viewed by the operator as follows: one high frequency consonant is assigned to the fifth thumb key; a second high frequency consonant is assigned to the eighth home key; a third high frequency consonant is assigned to the ninth home key; and a fourth high frequency consonant is assigned to the tenth home key; and a fifth high frequency consonant is assigned to the eleventh home key; wherein each of these five high frequency consonants is a different letter;

wherein the key tops of the second thumb key, the fifth thumb key, the second home key, the third home key, the fourth home key, the fifth home key, the eighth home key, the ninth home key, the tenth home key, and the eleventh home key are each parallel to the base of the machine to which the keyboard is attached, so that when the machine rests on a horizontal surface, the key top of each of these keys is horizontally oriented;

wherein the stroking surface of the third thumb key, the sixth thumb key, and all eight keys on the lower letter key row are each perpendicular to the base of the machine to which the keyboard is attached, so that when the machine rests on a horizontal surface, the stroking surface of each of these keys is vertically oriented with respect to this horizontal surface, and when fingers resting on home keys are bent toward the palm, they strike continuous vertically oriented keys; and wherein the first lower letter key is contiguous to the second home key, the second lower letter key is contiguous to the third home key, the third lower letter key is contiguous to the fourth home key, the fourth lower letter key is contiguous to the fifth home key, the fifth lower letter key is contiguous to the eighth home key, the sixth lower letter key is contiguous to the ninth home key, the seventh lower letter key is contiguous to the tenth home key, and the eighth lower letter key is continguous to the eleventh home key.

2. A keyboard, as in claim 1, comprising letter keys arranged as follows:

on the left hand side of the keyboard as viewed by the operator: a vowel assigned to the first thumb key; and on the right hand side of the keyboard as viewed by the operator: a consonant assigned to the fourth thumb key, a second consonant assigned to the fifth lower letter key, a third consonant assigned to the sixth lower letter key, a fourth consonant assigned to the seventh lower letter key, and a fifth consonant assigned to the eighth lower letter key; wherein each of these five consonants is a different letter.

3. A keyboard, as in claim 2, comprising letter and control keys arranged as follows:

on the left hand side of the keyboard as viewed by the operator: a vowel assigned to the first thumb key, and the carriage return key assigned to the fourth thumb key; and on the right hand side of the keyboard as viewed by the operator: a consonant on the fourth thumb key, and another consonant on the sixth thumb key.

4. A keyboard, as in claim 2, for the English language comprising letter and control keys arranged as follows:
   on the left hand side of the keyboard as viewed by the operator: on the thumb key row: U assigned to the first thumb key and space key is to the second thumb key: on the home key row: O assigned to the second home key, I assigned to the third home key, E assigned to the fourth home key, and A assigned to the fifth home key; and on the lower letter key row: case shift assigned to the third lower letter key; and
   on the right hand side of the keyboard as viewed by the operator: on the thumb key row: L assigned to the fourth thumb key and N assigned to the fifth thumb key; on the home key row: R assigned to the eighth home key, S assigned to the ninth home key, T assigned to the tenth home key, H assigned to the eleventh home key; and on the lower letter row: G assigned to the fifth lower letter key, C assigned to the sixth lower letter key, M assigned to the seventh lower letter key, and D assigned to the tenth lower letter key.

5. A keyboard, as in claim 2, for the Italian language comprising letter and control keys arranged as follows:
   on the left hand side of the keyboard as viewed by the operator: on the thumb key row: U assigned to the first thumb key and the space key is assigned to the second thumb key; on the home key row: O assigned to the second home key, I assigned to the third home key, A assigned to the fourth home key, and E assigned to the fifth home key; and on the lower letter key row: case shift assigned to the third lower letter key; and
   on the right hand side of the keyboard as viewed by the operator: on the thumb key row: M assigned to the fourth thumb key and N assigned to the fifth thumb key; on the home key row: L assigned to the eighth home key, S to the ninth home key, T assigned to the tenth home key, and R assigned to the eleventh home key; and on the lower letter key row: V assigned to the fifth lower letter key, P assigned to the sixth lower letter key, C assigned to the seventh lower letter key, and D assigned to the eighth lower letter key.

6. A keyboard, as in claim 2, for the Spanish language comprising letter and control keys arranged as follows:
   on the left hand side of the keyboard as viewed by the operator: on the thumb key row: U assigned to the first thumb key and space key is assigned to the second thumb key; on the home row: O assigned to the second home key, I assigned to the third home key, A assigned to the fourth home key, and E assigned to the fifth home key; and on the lower letter row: case shift assigned to the third lower letter key; and
   on the right hand side of the keyboard as viewed by the operator: on the thumb key row: L assigned to the fourth thumb key and R assigned to the fifth thumb key; on the home key row: S assigned to the eighth home key, T assigned to the ninth home key, N assigned to the tenth home key, and D assigned to the eleventh home key; and on the lower letter key row: G assigned to the fifth lower letter key, V assigned to the sixth lower letter key, M assigned to the seventh lower letter key, and C assigned to the eighth lower letter key.

7. A keyboard, as in claim 2, for the French language comprising letter and control keys arranged as follows:
   on the left hand side of the keyboard as viewed by the operator: O assigned to the first thumb key and space key is assigned to the second thumb key; and on the lower letter row: case shift assigned to the third lower letter key; and
   on the right hand side of the keyboard as viewed by the operator: on the thumb key row: M assigned to the fourth thumb key and N assigned to the fifth thumb key; on the home row: S assigned to the eighth home key, T assigned to the ninth home key, R assigned to the tenth home key, and L assigned to the eleventh home key; and on the lower letter key row: V assigned to the fifth lower letter key, P assigned to the sixth lower letter key, C assigned to the seventh lower letter key, and D assigned to the ninth lower letter key.

8. A keyboard, as in claim 2, for the German language comprising letter and control keys arranged as follows:
   on the left hand side of the keyboard as viewed by the operator: on the thumb key row: O assigned to the first thumb key and space key is assigned to the second thumb key; on the home row: A assigned to the second home key, U assigned to the third home key, E assigned to the fourth home key, and I assigned to the fifth home key; and on the lower letter key row: (lower case: umlaut; upper case: umlaut) assigned to the third lower letter key and case shift assigned to the fourth lower letter key; and
   on the right hand side of the keyboard as viewed by the operator: on the thumb key row: L assigned to the fourth thumb key and N assigned to the fifth thumb key; on the home key row: R assigned to the eighth home key, S assigned to the ninth home key, T assigned to the tenth home key, and D assigned to the eleventh home key; and on the lower letter row: F assigned to the fifth lower letter key, G assigned to the sixth lower letter key, C assigned to the seventh lower letter key, and H assigned to the eighth lower letter key.

9. A keyboard, as in claim 4, for the English language comprising character and control keys arranged in serial order along key rows as viewed by the operator from the outer edge of the keyboard to the center of the keyboard as follows:
   on the left hand of the keyboard as viewed by the operator: along the thumb key row: U assigned to the first thumb key, space key is assigned to the second thumb key, and the carriage return assigned to the third thumb key; along the home key row: Z assigned to the first home key, O assigned to the second home key, I assigned to the third home key, E assigned to the fourth home key, A assigned to the fifth home key, (lower case: hyphen; upper case: underline) assigned to the sixth home key: on the lower letter key row: (lower case: comma; upper case: comma) assigned to the first lower letter key; Y assigned to the second lower letter key; case shift assigned to the third lower letter key; and (lower case: period, upper case: period) assigned to the fourth lower letter key; on the upper letter row: (lower case: one) assigned to the first upper letter key; (lower case: colon: upper case: open parenthesis) assigned to the second upper letter key, J assigned to the third upper letter key, (lower case: apostrophe; upper case: semicolon) assigned to the fourth upper letter key, X assigned to the fifth upper letter key, (lower case: question mark; upper case: exclamation point) assigned to the sixth upper letter key; and in lower case positions on the number key row: slash assigned to the first number key, 3 assigned to second number key, 5 on the third number key, 7 on the fourth number key, and 9 on the fifth number key;

on the right hand side of the keyboard as viewed by the operator: on the thumb key row: L assigned to the fourth thumb key, N assigned to the fifth thumb key, and V assigned to the sixth thumb key; on the home key row: R assigned to the eighth home key, S assigned to the ninth home key, T assigned to the tenth home key, and H assigned to the eleventh home key; and on the upper letter key row: (lower case: zero) assigned to the seventh upper letter key, (lower case: double quotation marks; upper case: close parenthesis) assigned to the eighth upper letter key, B assigned to the ninth upper letter key, W assigned to the tenth upper letter key, P assigned to the eleventh upper letter key, and K assigned to the twelfth upper letter key; and in lower case positions on the number key row: one-half assigned to the sixth number key, 2 assigned to the seventh number key, 4 assigned to the eighth number key, 6 to the ninth number key, and 8 to the tenth number key; and in the center of the keyboard as viewed by the operator: the code key and function keys.

10. A keyboard, as in claim 5, for the Italian language comprising character and control keys arranged in serial order along key rows as viewed by the operator from the outer edge of the keyboard to the center of the keyboard as follows:

on the left hand side of the keyboard as viewed by the operator: along the thumb key row: U assigned to the first thumb key, space key is assigned to the second thumb key, and the carriage return assigned to the third thumb key; along the home key row: O assigned to the second home key, I assigned to the third home key, A assigned to the third home key, and E assigned to the fourth home key; along the lower letter row: (lower case: hyphen; upper case underline) assigned to the first lower letter key; (lower case: apostrophe) assigned to the second lower letter key; (lower case: accent grave; upper case: accent grave) assigned to the third lower letter key, and case shift assigned to the fourth lower letter key; and along the upper letter row: (lower: case: accent acute; upper case: accent acute) assigned to the fourth upper letter key;

on the right hand side of the keyboard as viewed by the operator: along the thumb key row: M assigned to the fourth thumb key row, N assigned to the fifth thumb key, F assigned to the sixth thumb key; along the home key row: (lower case: period; upper case: period) assigned to the seventh home key, L assigned to the eighth home key, T assigned to the tenth home key, R assigned to the eleventh home key, and G assigned to the twelfth home key; along the lower letter key row: V assigned to the fifth lower letter key, P assigned to the sixth lower letter key, C assigned to the seventh lower letter key, and D assigned to the eighth lower letter key; and along the upper letter key row; Z assigned to the eighth upper letter key, (lower case: comma; upper case comma) assigned to the ninth upper letter key, B assigned to the tenth upper letter key, H assigned to the eleventh upper letter key, and Q assigned to the twelfth upper letter key;

in the center of the keyboard as viewed by the operator: the code key and function keys.

11. A keyboard, as in claim 6, for the Spanish language comprising character and control keys arranged in serial order along key rows as viewed by the operator from the outer edge of the keyboard to the center of the keyboard as follows:

on the left hand sides of the keyboard as viewed by the operator: along the thumb key row: U assigned to the first thumb key, space key is assigned to the second thumb key, and the carriage return assigned to the third thumb key; along the home key row: O assigned to the second home key, I assigned to the third home key, A assigned to the fourth home key, E assigned to the fifth home key, and (lower case: hyphen; upper case: underline) assigned to the sixth home key; along the lower letter key row: (lower case: period; upper case: period) assigned to the first lower letter key, (lower case: comma; upper case: comma) assigned to the second lower letter key, case shift assigned to the third lower letter key, and (lower case: accent acute; upper case: accent acute) assigned to the fourth lower letter key; and along the upper letter key: (lower case: inverted exclamation point; upper case: exclamation point) assigned to the third upper letter key, and (lower case: inverted question mark; upper case: question mark) assigned to the fifth upper letter key;

on the right hand side of the keyboard as viewed by the operator: along the thumb key row: L assigned to the fourth thumb key, R assigned to the fifth thumb key, and H assigned to the sixth thumb key; along the home key row: Y assigned to the seventh home key, S assigned to the eighth home key, T assigned to the ninth home key, N assigned to the tenth home key, D assigned to the eleventh home key, and P assigned to the twelfth home key; along the lower letter key row: G assigned to the fifth lower letter key, V assigned to the sixth lower letter key, M assigned to the seventh lower letter key, C assigned to the eighth lower letter key; and along the upper letter key row: N assigned to the seventh upper letter key, Z assigned to the eighth upper letter key, F assigned to the ninth upper letter key, Q assigned to the tenth upper letter key, B assigned to the eleventh upper letter key, and J assigned to the twelfth upper letter key; and in the center of the keyboard as viewed by the operator; the code key and function keys.

12. A keyboard, as in claim 7, for the French language comprising character and control keys arranged in serial order along key rows as viewed by the operator from the outer edge of the keyboard to the center of the keyboard as follows:

on the left hand side of the keyboard as viewed by the operator: along the thumb key row: O assigned to the first thumb key, space key is assigned to the second thumb key, and the carriage return to the third thumb key; along the home key row: Y assigned to the first home key, A assigned to the second home key, I assigned to the third home key, E assigned to the fourth home key, U assigned to the fifth home key, and (lower case: period; upper case: period) assigned to the sixth home key; along the lower letter key row: (lower case: circumflex; upper case: circumflex) assigned to the first lower letter key, (lower case: apostrophe) assigned to the second lower letter key, case shift assigned to the third lower letter key, and (lower case: accent acute; upper case: accent acute) assigned to the fourth lower letter key; and along the upper letter key row: (lower case: accent grave; upper case: accent grave) assigned to the third upper letter key, (lower case: hyphen; upper case: underline) assigned to the fourth upper letter key, and (lower case: period; upper case: period) assigned to the fifth upper letter key;

on the right hand side of the keyboard as viewed by the operator: on the thumb key row: M assigned to the fourth thumb key, N assigned to the fifth thumb key, and Q assigned to the sixth thumb key; along the home key row: X assigned to the seventh home key, S assigned to the eighth home key, T assigned to the ninth home key, R assigned to the tenth home key, L assigned to the eleventh home key, and J assigned to the twelfth home key; along the lower letter key row: V assigned to the fifth lower letter key, P assigned to the sixth lower letter key, C assigned to the seventh lower letter key, and D assigned to the eighth lower letter key; and along the upper letter key row: C assigned to the seventh upper letter key, and G assigned to the eighth upper leter key, B assigned to the ninth upper letter key, F assigned to the tenth upper letter key, H assigned to the eleventh upper letter key, and Z assigned to the twelfth upper letter key; and in the center of the keyboard as viewed by the operator: the code key and function keys.

13. A keyboard, as in claim 8, for the German language comprising character and control keys arranged in serial order along key rows as viewed by the operator from the outer edge of the keyboard to the center of the keyborad as follows:

on the left hand side of the keyboard as viewed by the operator: along the thumb key row: O assigned to the first thumb key, space key is assigned to the second thumb key, and the carriage return assigned to the third thumb key; along the home key row: A assigned to the second home key, U assigned to the third home key, E assigned to the fourth home key, and I assigned to the fifth home key; along the lower letter key row: (lower case: comma; upper case: comma) assigned to the first lower letter row, (lower case: period; upper case: period) assigned to the second lower letter key, (lower case: umlaut; upper case: umlaut) assigned to the third lower letter key, and case shift assigned to the fourth lower letter key;

on the right hand side of the keyboard as viewed by the operator: along the thumb key row: L assigned to the fourth thumb key, N assigned to the fifth thumb key, M assigned to the sixth thumb key; along the home key row: V assigned to the seventh home key, R assigned to the eighth home key, S assigned to the ninth home key, T assigned to the tenth home key, D assigned to the eleventh home key, and B assigned to the twelfth home key; and along the lower letter key row, F assigned to the fifth lower letter key, G assigned to the sixth lower letter key, C assigned to the seventh lower letter key, and H assigned to the eighth lower letter key; and along the upper letter row: $\beta$ assigned to the eighth upper letter key, Z assigned to the ninth upper letter key, W assigned to the tenth upper letter key, K assigned to the eleventh upper letter key, and P assigned to the twelfth upper letter key; and in the center of the keyboard as viewed by the operator: the code and function keys.

* * * * *